Patented Sept. 1, 1942

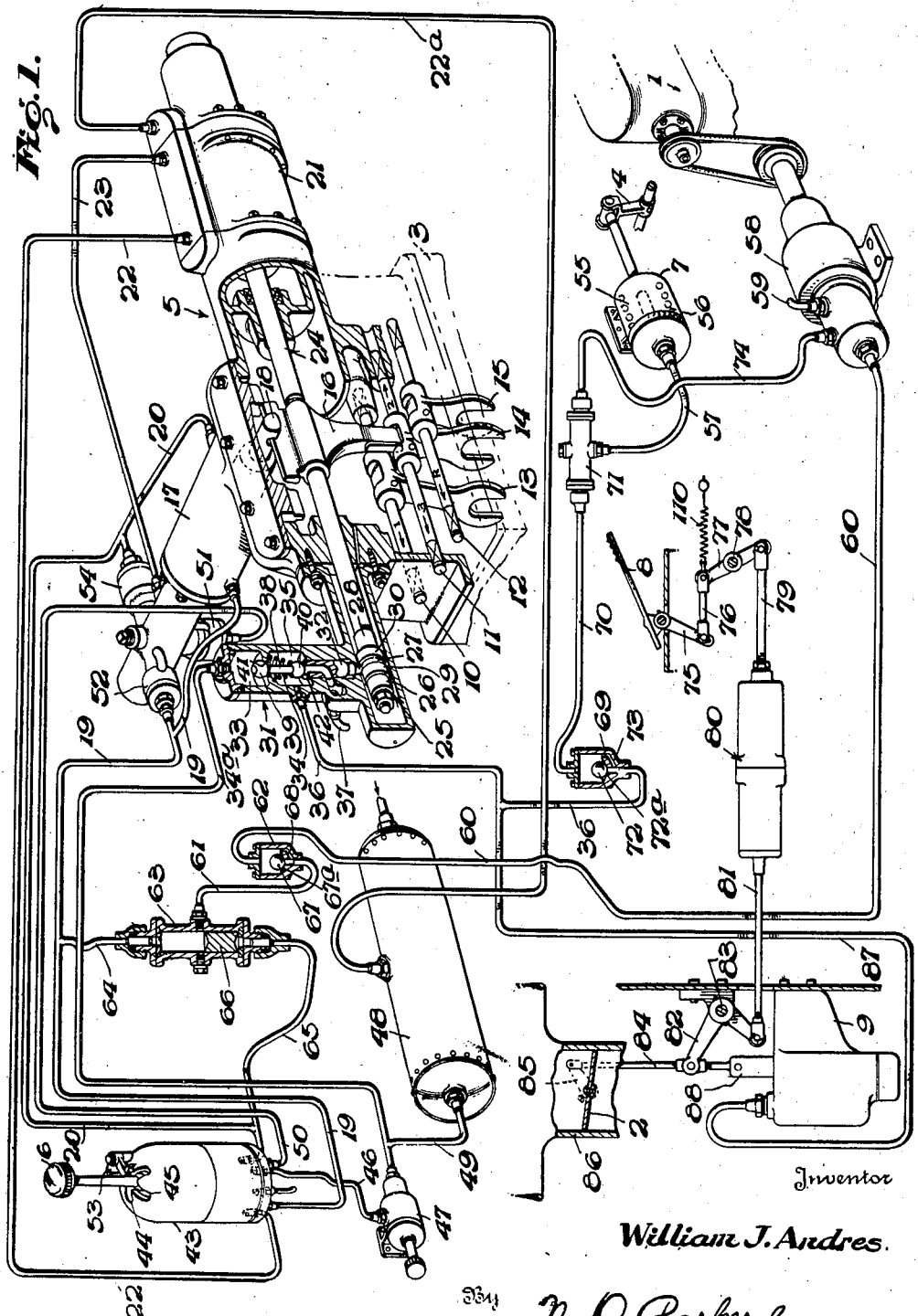

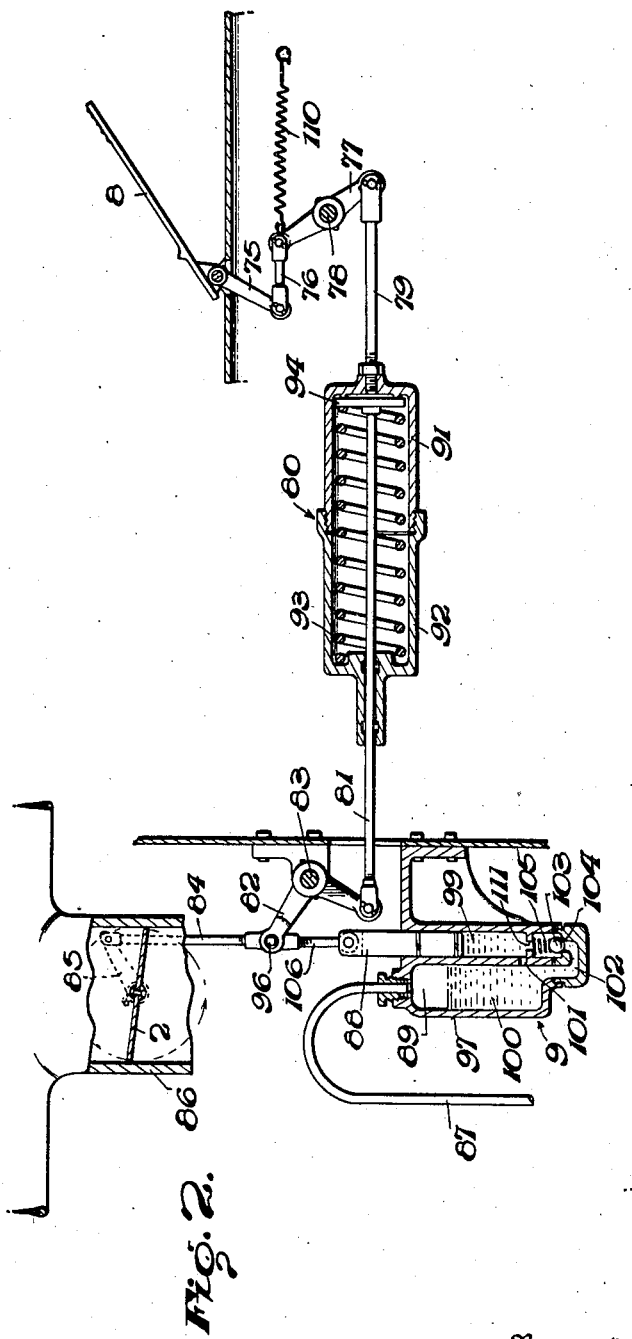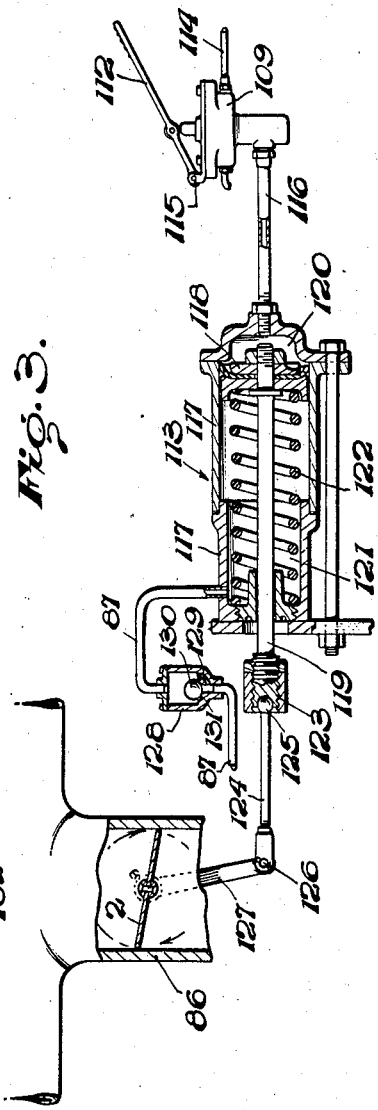

2,294,823

UNITED STATES PATENT OFFICE 2,294,823

GEAR SHIFTING MECHANISM

William J. Andres, Pittsburgh, Pa., assignor to Bendix-Westinghouse Automotive Air Brake Company, Pittsburgh, Pa., a corporation of Delaware Application January 30, 1940, Serial No. 316,445

20 Claims. (Cl. 192—.01)

This invention relates to a controlling mechanism for automotive vehicles and more particularly to a mechanism for controlling the operation of the vehicle clutch, engine throttle valve and the ratio-changing transmission.

Various mechanisms and arrangements have been heretofore proposed for the combined control and operation of the transmission gearing and clutch of an automotive vehicle in an effort to simplify the operating controls of such vehicles. In certain of the prior installations, apparatus has been utilized for coordinating the action of the vehicle clutch and engine throttle so that efficient operation of these two controls may be obtained. In most instances in the operation and control of automotive vehicles, however, it is highly desirable, for efficient acceleration of the vehicle in gear and to facilitate the gear-changing movements of the transmission, to coordinate the operations of the transmission, engine throttle and vehicle clutch. Accordingly, it is an object of the present invention to provide a control mechanism of this last mentioned character which will be readily adaptable to automotive vehicles of the present commercial type.

Another object of the invention is to provide a vehicle-controlling mechanism which will be so constituted as to enable the selection and establishment of a desired gear relation on the part of the operator by the movement of a controlling member in a desired direction, such mechanism, in its subsequent operation, automatically controlling the movements of the vehicle clutch and engine throttle valve.

A further object is to provide an arrangement of the above type including a construction for automatically controlling the engine throttle during gear-shifting operations while permitting the operator to maintain the accelerator in a predetermined advanced position, such an arrangement securing proper coordinated operation of the throttle and transmission without the exercise of any particular skill on the part of the operator.

Another object is to provide, in a device of the foregoing character, a novel construction insuring automatic operation of the vehicle clutch and engine throttle in proper timed relation and in response to operation of the transmission, in order to secure a double clutching action of the latter intermediate the shift from one gear relation to another, thereby greatly facilitating the establishment of the new gear relation.

Still another object comprehends a relatively simple and efficiently-operable apparatus for effecting the above and other desirable advantages and results and one which may be economically manufactured and installed.

Other objects and novel features of the invention will appear more fully hereinafter from the following detailed description when taken in connection with the accompanying drawings, wherein two embodiments of the invention are illustrated. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 1 is a diagrammatic view, partly in section, illustrating an automotive vehicle ratio-changing transmission mechanism, a clutch-controlling member, and throttle control mechanism constructed in accordance with the principles of the present invention;

Fig. 2 is a detailed view, partly in section, of the automatic throttle control shown in Fig. 1, and Fig. 3 is a view, partly in section, showing another form of automatic throttle control.

Referring more particularly to Fig. 1, the present invention is illustrated therein in connection with an automotive vehicle having an engine 1, a throttle 2, a ratio-changing transmission 3 and a clutch-controlling member 4. The transmission 3 has associated therewith any suitable fluid pressure-operated gear-shifting mechanism 5 adapted to be controlled from a remote position through movement of the manually-operable lever 6. The clutch-controlling member 4 is adapted to be operated by a fluid motor 7, while the throttle 2 may be controlled either manually by the movements of accelerator pedal 8 or automatically through the operation of the pressure-responsive mechanism 9, the construction being such that, during the operation of the gear-shifting mechanism, the clutch-controlling member 4 and the engine throttle 2 will be automatically controlled so that the automotive vehicle clutch will be efficiently engaged and disengaged and the throttle will be automatically opened and closed in proper sequence with changes in the transmission gear ratio. The construction of the present invention, moreover, insures that the automotive vehicle clutch will be engaged and disengaged and the throttle will automatically be opened and closed prior to an engagement of transmission gears, thereby producing a double clutching action which lessens the strain on the clutch and transmission mechanisms as well as producing a smoother and quieter establishment of gear ratios.

Although any suitable power-operated apparatus 5 may be utilized for effecting changes in the gear ratios of the transmission 3, it is preferred to employ the apparatus constructed in accordance with the application of Roy S. Sanford, Serial No. 57,410, filed January 3, 1936, for Gear shifting mechanism which has eventuated in Patent No. 2,189,679, issued Feb. 6, 1940. Such an apparatus, as illustrated herein, is associated with a transmission of the type having three shifting rails, 10, 11 and 12, for shifting the transmission gears by means of shifting forks 13, 14 and 15 respectively secured thereto. The shifting rails 10 and 12, when moved to the left, as viewed in Fig. 1, establish first and reverse gear relations respectively, while the corresponding movement of shifting rail 11 establishes third gear relation and opposite movement thereof establishes second gear relation. As shown, a combined selector and shifter finger 16 is adapted to cooperate with the shifter forks in order to select and shift to the desired gear ratio. The finger 16 is adapted to be oscillated to effect the above mentioned selecting movements by means of a fluid actuator 17, having a pressure-responsive piston therein, rigidly connected to a piston rod 18 which cooperates with the finger 16, fluid pressure being supplied to either side of said piston through conduits 19 or 20 depending upon which is energized. The shifting movements of the finger are accomplished by means of a shifting actuator 21 having a double-acting fluid-operable piston contained therein, and being supplied by fluid pressure through conduits 22 and 23. A pair of neutralizing pistons, not shown, are associated with the piston and are subject at all times to fluid pressure from reservoir 48 through conduit 22a, the construction being such that, upon exhaust of fluid pressure from the shifting actuator through conduits 22 or 23, depending upon which is energized, the neutralizing pistons will be effective to return the finger 16 to neutral position, it being understood that the shift rail with which the finger is associated is likewise moved to neutral.

For the purpose of energizing the clutch motor 7 during operation of the power apparatus 5, a valve mechanism 31 is provided which is automatically operated by a cam mechanism 25 operatively connected to the left-hand extremity of piston rod 24, as viewed in Fig. 1. Said cam mechanism is composed of cam portions 26 and 28, neutral groove 27, and enlarged cam portions 29 and 30. Valve mechanism 31, associated with the shifting mechanism 5 and responsive to movements of the cam mechanism, contains therein a movable member 32 which follows the contour of the cam mechanism heretofore described during shifting movements of the piston rod 24. Valve 31 also includes a fluid pressure chamber 33, supplied with fluid pressure through a conduit 34a, and a second chamber 35 which communicates with the clutch motor 7 by means of a conduit 36. The valve mechanism further includes an exhaust conduit 37 affording an atmospheric connection with the chamber 35, said connection being controlled by the movable member 32 which functions as a slide valve. A double ball valve member 38, normally held in closed position by the spring 34, includes valves 39 and 40 adapted to respectively cooperate with seats 41 and 42, said valves controlling the opening of the fluid pressure communication between the chambers 33 and 35, and also the exhaust connection between chamber 35 and conduit 37.

In order to remotely control the application of fluid pressure to and from the power-operated gear-changing apparatus, the manually-operated lever 6 is associated with a control valve mechanism 43, the latter being preferably constructed as shown in the patent to Stephen Vorech No. 2,075,917, dated April 6, 1937, for Control mechanism. A mechanism of this type includes a plurality of valves arranged within a casing, the latter having at its upper portion a pair of intersecting slots 44 and 45. Movement of the lever 6 to the left in slot 44 will effect operation of the valve controlling communication between conduits 22 and 46, the latter being connected through a suitable pressure-reducing valve 47 with a reservoir 48 through conduit 49. The aforesaid movement of the lever 6 serves to conduct fluid pressure to the shifting actuator 21 to effect second gear relation. The movement of the lever 6 to the extreme right in slot 44 serves to connect conduit 50 to the reservoir, fluid pressure being conducted through said conduit to conduit 23 by way of valve 51 which, when the selector actuator 17 is neutralized, is normally open. This operation establishes third gear relation. The movement of the lever 6 to the left in slot 45 establishes a communication between conduit 19 and the reservoir and charges a valve 52 and selector 17 with fluid pressure. The valve 52 is opened as soon as sufficient movement of the actuator 17 takes place to select shift rail 10 through the oscillation of finger 16, and thus fluid pressure is conducted to the shifting actuator 21 through conduits 19 and 23. This operation establishes first gear relation. In order to select reverse gear relation, the lever 6 is moved to the right in slot 45, after the lever 53 has been moved to permit such movement, in order to connect conduit 20 to the reservoir. When the conduit 20 is charged with fluid pressure, valve 54 and the actuator 17 are simultaneously charged, the valve 54 being opened as soon as the actuator 17 has moved a sufficient amount to effect engagement between the selector finger 16 and the shifting fork 15 attached to the rail 12, thereby forming a connection between conduits 20 and 23 to supply the actuator 21 with fluid pressure to complete the gear engagement.

Automatic means responsive to engine speed are provided for controlling the operation of the clutch motor 7 when the transmission is moved to establish first or reverse gear relation. Normally, the clutch is held in engaged position through the action of the usual return springs associated therewith, aided by a spring 55 in clutch motor 7. Fluid pressure admitted to the motor through a conduit 57 will effect clutch-disengaging movement of the motor and the clutch-controlling member 4. Such automatic means referred to may be a centrifugally-controlled valvular mechanism preferably constructed in accordance with the application of Roy S. Sanford, Serial No. 171,570, filed October 28, 1937, for Vehicle control mechanism which has eventuated in Patent No. 2,228,612, issued Jan. 14, 1941. The construction of an apparatus of this type is such that, when the engine 1 is idling, fluid pressure passes through the mechanism to energize the clutch motor 7, thereby holding the clutch-controlling member 4 in a disengaged position. As the speed of the engine is increased, the valvular mechanism operates to close the fluid pressure communication to the fluid motor 7 and gradually open a communication between said motor and an exhaust port 59, associated with said valvular mechanism, thereby gradually exhausting fluid pressure from the fluid motor 7 through exhaust port 59, to slowly and smoothly permit the clutch-controlling member 4 to be moved to clutch-engaged position.

The centrifugally-controlled valvular mechanism is supplied with fluid pressure through conduits 60 and 61, there being a check valve 62 connecting the last named conduits, the purpose and operation of which will be fully described hereinafter. A double check valve 63 having separate connections with conduits 19 and 20 by conduits 64 and 65 respectively is provided with a pressure-responsive member 66 in order to allow connection between either conduits 19 or 20 and the centrifugally-controlled valvular mechanism 58, depending upon which conduit is energized.

As heretofore stated, conduits 19 and 20, when energized, operate means to select and establish first and reverse gear relations respectively. Therefore, the valvular mechanism 58 will be supplied with fluid pressure only when the lever 6 is moved to the proper position to establish first and reverse gear relations. When other movements of lever 6 are made, the valve mechanism 31 operates to energize the fluid motor 7, thereby controlling engaging and disengaging movements of the clutch-controlling member 4 in proper sequence with the movements of the fluid actuators 17 and 21, the operation of which will be described more fully hereinafter.

The check valve 62, interposed between conduits 60 and 61, contains therein a ball valve 67 normally cooperating with the recessed seat 67a by the force of gravity, and a choke by-pass 68 around said ball valve. Fluid pressure passing from conduit 61 to conduit 60 will force the ball valve from its seat and said fluid pressure will flow past the ball valve 67 and through the by-pass 68. However, when conduit 61 is connected to the atmosphere, said connection being made as the lever 6 passes through its neutral position, fluid pressure is slowly exhausted from conduit 60 since the flow of fluid pressure is obstructed by the check valve 62, the communication being through the small choke 68.

When shifting from neutral to first or reverse gear relation, and particularly when shifting to first gear relation, it is advantageous for conduit 60 to be quickly energized in order that the centrifugal valve 58 may be energized sufficiently to exercise a satisfactory control over the clutch-engaging operation of clutch motor 7, and the check valve 62 is so constructed as to permit this desirable action to occur. When shifting from first gear relation to second gear relation, on the other hand, it will be apparent that, as soon as the control lever 6 is moved to the second speed position, the conduit 19 will be opened to atmosphere and will tend to deenergize the centrifugal valve 58 almost instantaneously through conduit 60, check valve 62, conduit 61, double-check valve 63 and conduit 64, and, if the engine were running at low speed during this period, the intake valve of the centrifugal valve would be open, resulting in an immediate deenergization of the entire valve. Such action has been found to result in a sudden energization of the clutch motor 7 with the corresponding rapid and unpleasant clutch engagement, and, in order to prevent this undesirable condition from arising, a choke by-pass 68 is provided in the check valve 62 to retard the exhaust of fluid pressure from the centrifugal valve through the channels above described. It will thus be seen that the use of a check valve of the above construction between the conduits 61 and 60 aids materially in effecting a smooth and automatic clutch engagement, particularly when shifting from first to second speed.

As heretofore stated, when the lever 6 is moved to such a position to establish second and third gear relations, the fluid motor 7 is energized due to the movements of the valve mechanism 31. When the movable member 32 is in such position that chamber 33 communicates with chamber 35, the fluid motor 7 is energized by way of conduit 36, check valve 69, conduit 70, double check valve 71 and conduit 57. Check valve 69 is constructed in a similar manner as check valve 62, having therein a ball valve 72 normally resting upon a seat 72a, and a choke by-pass conduit 73 around said ball valve for the purpose of retarding exhaust from the fluid motor, thereby obtaining a smooth and gradual engaging movement of the clutch-controlling member 4. The double check valve 71, being connected to the fluid motor 7 by means of conduit 57, is constructed in a similar manner as the double check valve 63. Conduits 70 and 74 respectively connect said double check valve to the valve mechanism 31 and centrifugally-controlled valvular mechanism 58. A pressure-responsive element similar to element 66 is contained within valve 71, thereby permitting connection between conduit 57 and conduits 70 or 74, depending upon which of the two last named conduits is energized.

Means are provided by the present invention to automatically control the movements of throttle 2 in proper sequence with movements of the clutch-controlling member 4, irrespective of the position of the accelerator pedal 8. Such means include the fluid pressure-responsive mechanism 9 which is operatively connected to the mechanical connection between the accelerator pedal 8 and the throttle valve 2. The latter mechanical connection more particularly comprises a crank 75 rigidly connected with the accelerator pedal 8 and cooperating by means of a link 76 with one end of a rocker arm 77, said arm being movable about a pin 78. A rod 79 cooperates with the other end of said rocker arm and transmits movement to rod 81, through a resilient connector 80, to be referred to more particularly hereinafter. A bell crank 82, being pivoted about the pin 83, has one end thereof connected to the rod 81 and the other cooperating with a throttle rod 84, the latter being connected to a crank 85 associated with the throttle 2 positioned in the intake manifold 86 of the engine 1.

The pressure-responsive mechanism 9 referred to above is adapted to be energized with fluid pressure by movements of valve mechanism 31, through conduits 36 and 87, to impart movement to a piston 88 contained therein. Since the piston is operatively connected to throttle rod 84, the throttle may be automatically operated independently of movements of the accelerator pedal 8, the resilient connector 80 allowing independent movements of rods 79 and 81 with respect to each other, as will appear hereinafter.

The construction and operation of this last mentioned feature of the invention will be more fully understood if reference be made to Fig. 2, wherein the throttle-operating mechanism is illustrated in an enlarged view.

The resilient connector 80 interposed in the mechanical throttle-operating mechanism comprises two casings 91 and 92, a rod 79 being rigidly connected to casing 91. Interposed within said casings is a spring 93, one end thereof abutting against the inner surface of the end of casing 92 and the other abutting against a piston 94, said spring normally maintaining the parts in the position shown. The piston 94 is rigidly connected to a rod 81 which passes through the end of casing 92 and is allowed to freely move therethrough. Preferably, the piston is constructed in such a manner as to loosely fit in casings 91 and 92 so that air may freely pass around the periphery thereof.

The pressure-responsive mechanism 9 comprises a casing 97 having a reservoir 89 and cylinder 99. Any suitable hydraulic fluid 100 is contained in the reservoir and is allowed to pass to the cylinder through a small opening 101 and through a passage 102, past the ball valve 103. The latter valve normally rests upon a seat 104 through the action of a spring 105 and normally prevents flow of fluid from said cylinder to said reservoir via passage 102. The piston 88 co-operates with the cylinder 99 and is operatively connected to the throttle arm 84 as by means of a rod 106.

Fluid pressure is supplied to reservoir 89 through conduit 87, said conduit, as heretofore stated, being connected to conduit 36, as viewed in Fig. 1. Pressure-responsive mechanism 9 is consequently energized by the operation of the valve mechanism 31.

Referring to the operation of this feature of the invention, the throttle 2 may be controlled in the conventional manual way by movements of the accelerator pedal 8. As the accelerator pedal is moved downwardly by the pressure of the operator's foot, the arm 75 is caused to rotate in a clockwise direction, said movement of arm 75 causing movement of link 76 to the left, as viewed in Fig. 2, thereby imparting an anticlockwise movement to the rocker arm 77 about the pivot 78. Due to the aforesaid movement of said rocker arm, rod 79 will move to the right, causing similar movement of casings 91 and 92 of the resilient connector 80 since said casings and rod 79 are rigidly connected together.

At the initial movement of the casings 91 and 92 to the right, the spring 93 will be compressed until the frictional force in the remaining throttle mechanism and the force necessary to transmit fluid contained in cylinder 99 to reservoir 89 is equal to the force exerted by the compressed spring 93. When an equilibrium is reached between the two aforementioned forces, the spring 93 will cease to be compressed and the motion of the rod 79 will be imparted to the rod 81 through the casings 91 and 92, the spring 93 and the piston 94.

The movement of the rod 81 to the right imparts an anticlockwise rotation to the bell crank 82, about the pin 83, thereby causing a downward movement of the throttle rod 84. The above mentioned movement of the throttle rod will cause the link 85 to rotate in a clockwise direction, thereby rotating the throttle 2 in the same direction since the arm 85 and the throttle 2 are rigidly connected. As the arm 84 moves downwardly, the piston 88 receives the same movement and the fluid contained in cylinder 99 will be forced therefrom, through the passage 101 into the reservoir 89.

As the operator releases the pressure of his foot from the accelerator pedal 8, the tension of a spring 110 causes the aforementioned movements to operate in the reverse direction, imparting an anticlockwise movement to the throttle, thereby moving the same to closed or idling position.

The pressure-responsive mechanism 9 operates in such a manner as to close throttle 2, if it has been opened to a predetermined position by the movement of the accelerator pedal 8, as heretofore described, and also to permit opening of said throttle to said predetermined position. It is to be fully understood that these movements are performed automatically by means of the pressure-responsive mechanism 9, the accelerator pedal 8 being in the same position throughout the operations.

Assuming the throttle 2 to be half open, the piston 88 extends further into the cylinder 99, due to the downward movement of the throttle rod 84, and the piston 94 is at the right end of the casing 91. By the operation of the valve mechanism 31, the conduit 87 is energized with fluid pressure, said pressure entering the reservoir 89 and acting upon the surface of the pressure-responsive fluid 100, forcing said fluid into the cylinder 99 through the opening 101 and also through passage 102, past the ball valve 103 and through opening 111. The fluid acts upon the face of the piston 88, causing movement of the latter relative to the cylinder 99, transmitting an anticlockwise rotation to the throttle 2 due to the upward movement of the rod 84, thereby moving said throttle to a closed position.

As the piston 88 is forced upwardly by the force of fluid pressure, the bell crank 82, being operatively connected thereto, will rotate in a clockwise direction about the pin 83, thereby causing the rod 81 to move toward the left, as viewed in Fig. 2. The movement of the rod 81 to the left will compress the spring 93 since the casings 91 and 92 remain stationary by the force of the operator's foot on the accelerator pedal 8.

Means are provided by the present invention to prevent the hydraulic fluid in cylinder 99 from quickly flowing to its normal level in the reservoir 89 when conduit 87 has been exhausted to atmosphere. The action of the spring 93 is thereby retarded and the throttle is allowed to gradually open to a position determined by the accelerator pedal 8. As shown, such means include the ball valve 103 which is forced against the seat 104 by the spring 105 when conduit 87 is exhausted. Thus the hydraulic fluid is prevented from returning to the reservoir by way of passage 102. Since the fluid flows from the cylinder to the reservoir only through the small opening 101, the downward movement of the piston 88 is thereby retarded and a gradual opening of the throttle is obtained. It is to be pointed out, however, that the size of the opening 101 is of such a nature that the rate of opening movement of the throttle will be properly coordinated with the engaging movement of the clutch in order to obtain an efficient and smooth acceleration of the vehicle after a desired gear relation has been established.

Referring more particularly to Fig. 3, another form of an automatic throttle control is illustrated therein in connection with the throttle 2, which is rotatably mounted in the intake manifold 86. In this form, fluid pressure means is employed for controlling the opening and closing of the throttle and includes a valve mechanism 109 operable by manual movements of the pedal 112. A fluid pressure actuator 113 is adapted to be controlled by valve mechanism 109 and is constructed in such a manner as to allow controlling movements of the throttle 2 to be obtained under the action of valve mechanism 109 as well as fluid pressure mechanism controlled by the gear-shifting apparatus. The valve mechanism 109 may be any suitable type of self-lapping valve, such as, for example, shown in the patent to William J. Andres and Roy S. Sanford, dated October 18, 1938, No. 2,133,275, for Control mechanism. The valve mechanism is supplied with fluid pressure from the reservoir 48 through conduit 114 and is adapted to conduct such pressure to an outlet conduit 116, communicating with the fluid pressure actuator 113. The pedal 112, rotatable about the pivot 115, is adapted to respond to pressure applied thereon by the operator's foot for controlling the degree of fluid pressure passing to conduit 116.

The fluid pressure actuator 113 comprises a casing 117, having therein a pressure-responsive piston 118 which divides the casing into chambers 120 and 121. The chambers are respectively supplied with fluid pressure through conduits 116 and 87. A spring 122, positioned within chamber 121, abuts the face of the piston and the inner end of the casing 117 and opposes movement of the piston to the left, as viewed in Fig. 3.

A piston rod 119 is operatively connected to the piston and extends outside the chamber 121 where a socket 123 is threadedly connected thereto. A rod 124 provided with a ball 125 fixed to one end thereof cooperates with the socket 123, the other end of the rod being operatively connected to a crank 127 by means of a pin 126. The crank 127, being operatively connected to the throttle 2, imparts movements thereto. Check valve 128 positioned in conduit 87 and constructed similarly to check valves 62 and 69, as viewed in Fig. 1, contains therein a ball valve 130, normally positioned against the seat 131, and a choke by-pass 129, which restricts the flow of fluid pressure from chamber 121 to the atmosphere, thereby allowing the throttle to slowly open, as will appear fully hereinafter.

The operation of this form of the present invention is as follows. As heretofore stated, the pressure of the operator's foot upon the pedal 112 causes a clockwise movement thereof about the pin 115, said movement allowing a proportional degree of fluid pressure to enter conduit 116. Fluid pressure is conducted from conduit 116 to chamber 120 of the actuator 113 and acts upon the face of the piston 118 imparting movement to the left against the tension of the spring 122, as viewed in Fig. 3. The piston rod 119, being operatively connected to the piston 118, moves in like manner and imparts similar movement to the rod 124, through the ball 125 and the socket 123. As the rod 124 moves to the left, the crank 127 rotates in a clockwise direction, rotating the throttle 2 to move the same toward open position. As the pressure of the operator's foot is increased upon the pedal 112, fluid pressure in chamber 120 will correspondingly increase, thereby causing additional movement of the piston 118 to the left and opening the throttle wider.

When the pressure applied to pedal 112 is gradually reduced, fluid pressure in chamber 120 will be reduced a corresponding degree. The piston 118 will then move to the right, due to the tension of the spring 122, moving rods 119 and 124 likewise to the right, thereby rotating the crank 127 and the throttle 2 in an anticlockwise direction, thus closing the communication to the intake manifold 86. As the pressure is completely removed from the pedal 112, the tension of the spring 122 will impart further anticlockwise movement to the throttle until the latter is moved to closed or idling position.

Assuming the throttle 2 to be in partially opening position, the piston 118 will be at an intermediate position in the cylinder 117, as viewed in Fig. 3. As conduit 87 is energized with fluid pressure, due to the movements of the valve mechanism 31, chamber 121 will likewise be energized and the piston 118 will move to the position shown in Fig. 3. When the valve mechanism 31 is moved to exhaust position, conduit 87 will be exhausted to atmosphere and chamber 121 will be likewise exhausted. The piston 118 will then return to its former position due to the presence of fluid pressure in chamber 120, thereby permitting opening of the throttle to the position controlled by the valve mechanism 111. It will be understood that the exhaust from chamber 121 to the atmosphere will be retarded by the choke by-pass 129, thus ensuring that the throttle will be gradually opened under the influence of the fluid pressure within chamber 120.

During operation of the invention illustrated in Fig. 1, with the mechanism in the neutral position illustrated, and with engine 1 idling, the clutch is in an engaged position, since no fluid pressure is transmitted to the clutch motor 7 when the mechanism is in the aforesaid neutral position.

Should it be desired to shift into first gear, member 6 is moved to the left-hand extremity of slot 45 and the valve of the mechanism 43, operated during this movement, connects the reservoir 48 to the conduit 19. The selector actuator 17 is thus charged in order to move finger 16 into an engagement with shifter fork 13, and, as soon as this latter action has been effected, valve 52 opens to connect conduit 19 with the shifting actuator 21 through conduit 23. As soon as conduit 19 is charged with fluid pressure, the double check valve 63 will function to conduct fluid pressure to the clutch motor 7 through conduit 61, check valve 62, conduit 60, centrifugally-controlled valvular mechanism 58, conduit 74, double check valve 71 and conduit 57. Clutch motor 7 will thereupon cause disengaging movement of member 4.

When the engine 1 is idling, fluid pressure is allowed to pass through the centrifugally-controlled valvular mechanism 58 to the clutch motor as above indicated. However, as the speed of the engine is increased, the centrifugally-controlled valvular mechanism 58 closes communication between conduits 60 and 74, and opens communication between conduit 74 and atmosphere through port 59. As the speed of the engine is increased, the fluid motor 7 is connected to the atmosphere by way of conduit 57, double check valve 71, conduit 74, valvular mechanism 58 and port 59, thereby permitting engaging movement of the clutch-controlling member 4 in accordance with increase in engine speed.

In establishing reverse gear relation, control member 6 is moved to the right-hand extremity of slot 45 in order to charge conduit 20 with fluid pressure. Such pressure, after causing operation of the actuator 17 and selection of the shifter fork 15, will pass through valve 54 and conduit 23, to effect movement of the piston rod 24 to the left, as viewed in Fig. 1. As conduit 20 is charged with fluid pressure, the double check valve 63 is likewise charged through conduit 65, thereby conducting fluid pressure to the valvular mechanism 58 through conduit 60. The clutch motor will hence be charged with fluid pressure as in the case when shifting into first gear relation. Engagement of the clutch will be likewise controlled by operation of valvular mechanism 58 upon increase in the speed of the engine.

In shifting to second and third gear relations, the selector mechanism 17 is not energized since the finger 16 is in its proper position to engage second and third gear relations when the mechanism is in neutral position. Therefore, it is only necessary to move the shifting rail 11 to the right or left, as viewed in Fig. 1. Movement of the lever 6 to the left in slot 44 will effect operation of the valve controlling communication between conduit 22 and the reservoir, thereby supplying fluid pressure to the shifting actuator 21 and moving the shifting rail 11 to the right to engage second gear relation. Third gear relation is established by movement of the lever 6 to the extreme right in slot 44, thereby connecting conduit 50 with the reservoir. As the conduit 50 is energized, valve 51, being normally open when the selector mechanism 17 is in neutral position, operates to establish a communication between conduits 50 and 23, thereby energizing the shifting actuator 21 to move the shifting rail 11 to the left, as viewed in Fig. 1.

When shifting from first to second and from second to third gear relations, the movement of the piston rod 24 imparts movement to the cam mechanism 25 connected thereto. As heretofore stated, the cam mechanism is so constructed that the follower 32 will successively contact either enlarged portions 29 or 30, the central neutral groove 27, and gain either the enlarged portions 29 or 30 before either second or third gear relation is finally established.

As the follower 32 contacts either enlarged portions 29 or 30, valve 31 is operated and fluid pressure is conducted to the clutch motor 7 through conduit 36, check valve 69, conduit 70, double check valve 71 and conduit 57. The automatic throttle control 9 is also energized through conduits 36 and 87. When either second or third gear relation has been established, the follower will contact either reduced cam surfaces 26 or 28 respectively. The follower, being in either of the latter positions, permits operation of valve 31 to close communication between conduit 36 and the reservoir and connect conduit 36 to the atmosphere through port 37, exhausting fluid pressure from the clutch motor 7 and the automatic throttle control 9 and thereby allowing engaging movement of the clutch-controlling member 4 and opening movement of the throttle 2. As the gear-shifting mechanism is operated to shift from one gear relation to another, the transmission will pass through a neutral position as well understood by those skilled in the art. When this neutral position is reached, the follower 32 will contact the neutral groove 27, thus permitting valve 31 to move to the position illustrated in Fig. 1, wherein valve 40 serves to connect conduit 36 with the exhaust conduit 37. When this occurs, the clutch will be allowed to engage and the throttle will be permitted to open an amount governed by the position of the accelerator pedal.

From the aforesaid operation, it is readily seen that, when shifting from first to second gear relation, or from second to third gear relation, the clutch and throttle will be automatically controlled in the following sequence. As the follower 32 contacts either the enlarged cam portions 29 or 30, when moving from either first or second gear relation, the clutch will be disengaged and the throttle closed due to the charging of conduit 36 with fluid pressure. As the follower contacts the central neutral groove 27, conduit 36 communicates with atmosphere through port 37, and fluid pressure is exhausted from the clutch motor 7 and the automatic throttle mechanism 9 through said port, thereby allowing engaging movements of the clutch-controlling member 4 and permitting opening of the throttle valve 2. Then, as the piston rod 24 moves to establish a new gear ratio, the follower contacts either the enlarged cams 29 or 30, operating the valve mechanism to conduct fluid pressure to the clutch motor 7 and the automatic throttle mechanism 9, to disengage the clutch and close the throttle. As the gear relation is established, the follower contacts either the smaller cam portions 26 or 28, causing the clutch to engage and the throttle to open as heretofore stated. In the aforesaid manner, double clutching action is obtained, the advantages of which have been mentioned heretofore.

There is thus provided by the present invention a novel and efficiently operable controlling mechanism for coordinating the shifting of the gears of an automotive vehicle with the operation of the clutch and opening and closing of the throttle. The arrangement is such that the control of an automotive vehicle by the operator is materially facilitated and simplified. In changing the transmission to the various gear ratios, the operator may, if he desires, maintain the accelerator pedal in a certain predetermined position during the entire changing of gears. The provision of the automatic throttle-closing mechanism and the automatically-operable declutching motor automatically secures a closing of the throttle and opening of the vehicle clutch prior to establishment of a selected gear ratio and this occurs automatically in response to movements of the gear shifting apparatus as controlled by the simple manipulation of the master controlling lever. The present invention, moreover, insures that, irrespective of the advanced position of the accelerator pedal, the throttle valve will be permitted to slowly open as the clutch gradually engages after a desired gear relation has been established, thus insuring a smooth acceleration of the vehicle. One of the very desirable features of the invention resides in the inclusion of means whereby, as the transmission passes through neutral in its change from one gear relation to another, the clutch is automatically allowed to engage and the throttle valve is automatically permitted to be opened. Thus, double clutching action is assured which is extremely desirable in certain instances when shifting from one gear relation to another.

While several embodiments of the invention have been illustrated and described herein, it is to be understood that the same is not limited thereto but may be embodied in various forms, as will be understood by those skilled in the art. Reference will, therefore, be had to the appended claims for a definition of the limits of the invention.

What is claimed is:

1. In an automotive vehicle having an engine, a throttle, a clutch-controlling member, and a transmission of the type having fluid-operated means for selecting and establishing one of a plurality of gear relations, a fluid motor for controlling the operation of said member, manually-operable means for opening and closing said throttle, fluid pressure-operated means for closing the throttle irrespective of the position of said manually-operable means, and means operated by movement of said fluid-operated means in a direction to establish a desired gear relation but prior to actual establishment of said relation for simultaneously energizing said fluid pressure-operated means and said fluid motor whereby the throttle is closed and said member is moved to clutch-disengaged position.

2. In an automotive vehicle having an engine, a throttle, a clutch-controlling member, and a transmission of the type having fluid-operated means for selecting and establishing one of a plurality of gear relations, a fluid motor for controlling the operation of said member, manually-operable means for opening and closing said throttle, fluid pressure-operated means for closing the throttle irrespective of the position of said manually-operable means, means operated by movement of said fluid-operated means in a direction to establish a desired gear relation but prior to actual establishment of said relation for simultaneously energizing said fluid pressure-operated means and said fluid motor, and means for causing operation of said last named means to deenergize said fluid pressure-operated means and said fluid motor after establishment of the desired gear relation.

3. In an automotive vehicle having an engine, a throttle, a clutch-controlling member and a gear-changing mechanism, a fluid motor for controlling the operation of said member, means for opening and closing said throttle, means operable by fluid pressure for closing said throttle irrespective of the position of said first means, and means actuated by said mechanism for supplying fluid energy to said motor and to said throttle closing means for causing clutch-disengaging movement of said member and closing movement of the throttle.

4. In an automotive vehicle having an engine, a throttle, a clutch-controlling member and a gear-changing mechanism, a fluid motor for controlling the operation of said member, manually-operable means for opening and closing said throttle, means operable by fluid pressure for closing said throttle irrespective of the position of said manually-operable means, a source of fluid power, means including a valve operable for simultaneously connecting said motor and throttle-closing means with the source, and means actuated by said mechanism for operating said valve.

5. In an automotive vehicle having an engine, a throttle, a clutch-controlling member, and a transmission of the type having fluid-operated means for selecting and establishing one of a plurality of gear relations, a fluid motor for controlling the operation of said member, manually-operable means for opening and closing said throttle, fluid pressure-operated means for closing the throttle irrespective of the position of said manually-operable means and for allowing opening of said throttle to a predetermined point controlled by said manually-operable means, means operated by movement of said fluid-operated means in a direction to establish a desired gear relation but prior to actual establishment of said relation for simultaneously energizing said fluid pressure-operated means and said fluid motor, means for causing operation of said last named means to deenergize said fluid pressure-operated means and said fluid motor after establishment of the desired gear relation, and means associated with said fluid pressure-operated means for retarding opening movement of said throttle under the action of said manually-operable means.

6. In an automotive vehicle having an engine, a fluid-operated gear-changing mechanism, a throttle, and a clutch-controlling member, means including a fluid motor for effecting the clutch-disengaging and clutch-engaging movements of said member, valve means controlled by the speed of said engine for effecting energization of said motor when said mechanism is in one predetermined gear-engaged position, manually-operable means including a resilient connection for controlling the opening and closing operations of said throttle, fluid pressure-operable means for closing said throttle when held in an open position by said manually-operable means and for allowing return of said throttle to said open position, means operated by movement of said mechanism in a direction to establish a desired gear relation but prior to actual establishment of said relation for simultaneously energizing said fluid pressure-operated means and said fluid motor, means for causing operation of said last named means to deenergize said fluid pressure-operated means and said fluid motor after establishment of the desired gear relation, and means associated with said motor and said fluid pressure-operated means for respectively retarding clutch-engaging movements of said member and opening movements of said throttle.

7. In an automotive vehicle having a throttle and a transmission of the type having fluid-operated means for selecting and establishing one of a plurality of gear relations, manually-operable means including a resilient connection for controlling the opening and closing operations of said throttle, fluid pressure-operated means for closing said throttle when held in an open position by said manually-operable means and for allowing return of said throttle to said open position, means operated by movement of said fluid-operated means in a direction to establish a desired gear relation but prior to actual establishment of said relation for energizing said fluid pressure-operated means, means for causing operation of said last named means to deenergize said fluid pressure-operated means after establishment of the desired gear relation, and means associated with said fluid pressure-operated means for retarding the opening movements of said throttle.

8. In an automotive vehicle having an engine, a throttle, a clutch-controlling member, and a transmission of the type having fluid-operated means for selecting and establishing one of a plurality of gear relations, a fluid motor for controlling the operation of said member, valve means responsive to the speed of said engine for energizing said motor when said mechanism is in one predetermined gear-engaged position, a valve device operatively associated with said fluid-operated means, a double check valve connected to said motor and having separate connections with said valve means and said valve device, manually-operated means for opening and closing said throttle, fluid pressure-operated means for closing said throttle when held in an open position by said manually-operated means and for allowing return of said throttle to said open position, said valve device operated by movement of said fluid-operated means in a direction to establish a desired gear relation but prior to actual establishment of said relation for simultaneously energizing said fluid pressure-operated means and said fluid motor, means for causing operation of said valve device to deenergize said fluid pressure-operated means and said fluid motor after establishment of the desired gear relation, and means associated with said motor and said fluid pressure-operated means for respectively retarding deenergization of said motor and opening movements of said throttle.

9. In an automotive vehicle having an engine, a clutch-controlling member, and a transmission of the type having fluid-operated means for selecting and establishing one of a plurality of gear relations, a fluid motor for controlling the operations of said member, valve means responsive to the speed of said engine for energizing said motor when said mechanism is in one predetermined gear-engaged position, a valve device associated with said fluid-operated means, a double check valve connected to said motor and having separate connections with said valve means and said valve device, said valve device operated by movement of said fluid-operated means in a direction to establish a desired gear relation but prior to actual establishment of said relation for energizing said fluid motor, means for causing operation of said valve device to deenergize said fluid motor after establishment of the desired gear relation, and when said fluid-operated means operates to neutralize said transmission, and means associated with said motor for retarding deenergization of said motor.

10. In an automotive vehicle having an engine, a clutch-controlling member and a gear-changing mechanism, a fluid motor for controlling the operations of said member, valve means responsive to engine speed for controlling the engaging and disengaging movements of said motor, means including a valve device responsive to movements of said mechanism for energizing said motor prior to establishment of a gear relation and for deenergizing said motor when said gear relation is established, means associated with said means for retarding deenergization of said motor, and a double check valve connected to said motor and having separate connections with said valve means and said means for connecting said motor with said valve means or said means.

11. In an automotive vehicle having an engine, a throttle, a clutch-controlling member, a fluid motor therefor, and a gear-changing transmission, manually-operable means including a resilient connection for controlling the opening and closing operations of said throttle, fluid pressure-operated means for closing said throttle when held in an open position by said manually-operable means and for allowing the return of said throttle to said open position, a source of fluid power, means including a valve for connecting said motor and said pressure-operated means with said source, means actuated by movement of said mechanism in a direction to establish a desired gear relation but prior to actual establishment of said relation for energizing said motor and said pressure-operated means, means for causing operation of said last named means to deenergize said motor and said pressure-operated means after establishment of the desired gear relation, and means associated with said fluid pressure-operated means and said motor for respectively retarding opening movements of said throttle and clutch-engaging movements of said member.

12. In an automotive vehicle having an engine, a clutch-controlling member, and a transmission of the type having fluid-operated means for selecting and establishing one of a plurality of gear relations, a fluid motor for controlling the operation of said member, valve means responsive to the speed of said engine for energizing said motor when said mechanism is in one predetermined gear-engaged position, a valve device operatively associated with said fluid-operated means, a double check valve connected to said motor and having separate connections with said valve means and said valve device for connecting said motor with said valve means or said valve device, said valve device operated by movement of said fluid-operated means in a direction to establish another desired gear relation but prior to actual establishment of said gear relation for energizing said fluid motor, means for causing operation of said valve device to deenergize said fluid motor after establishment of said gear relation, and means associated with said motor for retarding deenergization of said motor.

13. In combination with an automotive vehicle having a fluid-operated gear-changing mechanism, a throttle, fluid pressure means including a pressure-responsive element for controlling the opening and closing operations of said throttle, a manually-operated valve for controlling the fluid pressure energization of said element and a second fluid pressure means including a valve responsive to movements of said mechanism for controlling the fluid pressure energization of said element irrespective of said first valve.

14. In an automotive vehicle having an engine, a fluid-operated gear-changing mechanism, a throttle and a clutch-actuating member, means including a fluid motor for effecting the clutch-disengaging and engaging movements of said member, fluid pressure means including a pressure-responsive element for controlling the opening and closing operations of said throttle, a manually-operated valve for controlling said element, valve means controlled by the speed of said engine for effecting energization of said motor when said mechanism is in one predetermined gear-engaged position, second valve means responsive to the operation of said mechanism, a double check valve connected with said motor and having separate connections with said valve means and said second valve means for connecting said motor with said valve means or second valve means, and a conduit connecting said fluid pressure means to said second valve means whereby said element is controlled by the movements of said second valve means.

15. In combination with an automotive vehicle having an engine, a fluid-operated gear-changing mechanism, a clutch-actuating member, means including a fluid motor for controlling the movements of said member, second means including a centrifugally-controlled valve responsive to engine speed for supplying fluid pressure to said motor when said mechanism is in one predetermined gear-engaged position, valve means operable by said mechanism for controlling the energization of said motor, and a double check valve connected with said motor and having separate connections with said valve and said valve means for connecting said motor with said valve or valve means.

16. In an automotive vehicle having a gear-changing mechanism including a member operable to establish different gear ratios, fluid-operated means having a piston operatively contained therein, a piston rod connected to said piston and having said member connected thereto, means including a valve mechanism responsive to movements of said piston rod, a throttle having pressure-responsive means associated therewith for controlling the opening and closing movements thereof, and a fluid pressure conduit forming a communication between said valve mechanism and said pressure-responsive means whereby movements of said fluid-operated means toward a gear establishing position operate said power mechanism to supply fluid pressure to said pressure-responsive means and effect control of said throttle.

17. In an automotive vehicle having a gear-changing mechanism, fluid-operated means having a piston therein, a piston rod having one end connected to said piston and having a neutral and a gear establishing position, a member connected to said piston rod for establishing different gear ratios, manually-operable means for closing and opening said throttle, pressure-responsive means for closing the throttle irrespective of the position of said manually-operable means and for allowing opening of said throttle to a predetermined position controlled by said manually-operable means, means including a valve device responsive to movement of said piston rod, and a conduit connecting said valve device and said pressure-responsive means whereby said pressure-responsive means is energized during movement of said piston rod between said positions and deenergized when said piston rod is in either of said positions.

18. In an automotive vehicle having an engine, vehicle-controlling means and a throttle, manually-operable means including a resilient connection for controlling the opening and closing movements of said throttle, said resilient connection including a pair of relatively-movable members having a resilient element positioned therebetween, one of said pair of relatively-movable members operatively connected to said manually-operable means, fluid-operable means responsive to movements of said controlling means and having a piston therein, said piston connected to said throttle and to the other of said pair of relatively-movable members, whereby said fluid-operable means is responsive to movements of said controlling means to close said throttle when held in an open position by said manually-operable means and to allow said throttle to return to said open position, and means associated with said fluid-operable means for retarding the opening movement of said throttle.

19. In an automotive vehicle provided with a clutch-controlling member and a throttle-controlled intake manifold, a fluid motor for controlling the operation of said clutch-controlling member, means for opening and closing the throttle, fluid pressure-operated means for closing the throttle irrespective of the position of said first means, means for simultaneously energizing said motor and fluid pressure-operated means and means for retarding the rate of deenergization of said motor and fluid pressure operated means for effecting a coordinated control of said clutch controlling member and throttle.

20. In an automotive vehicle having a gear-changing mechanism and a throttle, means for moving said throttle to open and closed position, fluid pressure-operated means for moving the throttle to closed position irrespective of the position of said first means, and a valve device operable by said mechanism when moved in a direction to establish a desired gear relation for supplying fluid pressure to said fluid pressure-operated means.

WILLIAM J. ANDRES.